US008013566B2

(12) United States Patent
Haines

(10) Patent No.: US 8,013,566 B2
(45) Date of Patent: *Sep. 6, 2011

(54) SOLAR POWERED APPARATUS

(75) Inventor: Lance P. Haines, Wilmington, MA (US)

(73) Assignee: American Power Conversion Corporation, West Kingston, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/947,403

(22) Filed: Nov. 16, 2010

(65) Prior Publication Data

US 2011/0084647 A1    Apr. 14, 2011

Related U.S. Application Data

(63) Continuation of application No. 11/829,192, filed on Jul. 27, 2007, now Pat. No. 7,834,580.

(51) Int. Cl.
*H01M 10/44* (2006.01)
*H02N 6/00* (2006.01)
*H02J 7/00* (2006.01)

(52) U.S. Cl. ........ 320/101; 320/138; 320/139; 136/247; 136/291; 323/906

(58) Field of Classification Search .............. 320/101
See application file for complete search history.

(56) References Cited

U.S. PATENT DOCUMENTS

| 4,580,090 A | | 4/1986 | Bailey et al. | |
| 6,081,104 A | * | 6/2000 | Kern | 323/268 |
| 6,281,485 B1 | * | 8/2001 | Siri | 250/203.4 |
| 6,433,522 B1 | * | 8/2002 | Siri | 323/272 |
| 6,476,315 B2 | * | 11/2002 | Ganz | 136/244 |
| 6,949,843 B2 | | 9/2005 | Dubovsky | |
| 7,057,102 B2 | * | 6/2006 | Nagasawa | 136/251 |
| 2004/0211459 A1 | * | 10/2004 | Suenaga et al. | 136/244 |

OTHER PUBLICATIONS

Azbe, V. et al., "Distributed Generation from Renewable Sources in an Isolated DC Network", Renewable Energy, vol. 31, No. 14, Nov. 1, 2006.
Karvelis, G. A., et al. "A DC-DC Boost Coverter with Short Circuit Protection", Industrial Electronics, Control and Instrumentation, 1994. IECON '94., 20th International Conference in Bologna Italy Sep. 5-9, 1994. IEEE vol. 1, Sep. 5, 1994.
Kenyon, Robert et al., "Voltage Monitor Prevents Deep Discharge Battery", EDN Electrical Design News, Reed Business Information vol. 43, No. 10 May 7, 1998.
Mineiro, Edison S., et al."Photovoltaic System for Supply Public Illumination in Electrical Energy Demand Peak", Applied Power Electronics Conference and Exposition, 2004, IEEE vol. 3, Feb. 22, 2004.

* cited by examiner

*Primary Examiner* — Edward Tso
*Assistant Examiner* — Yalkew Fantu
(74) *Attorney, Agent, or Firm* — Lando & Anastasi, LLP

(57) ABSTRACT

A solar powered apparatus that includes a battery, at least one photovoltaic cell (which may be part of a solar module comprising multiple photovoltaic cells), and a DC-capable AC appliance, such as a compact fluorescent light. The solar powered apparatus may also include a first DC to DC converter that receives a first electrical signal from the at least one photovoltaic cell and provides a charging signal to the battery, and a second DC to DC converter that receives a second electrical signal from the battery and provides a DC power signal to the DC-capable AC appliance.

20 Claims, 3 Drawing Sheets

SOLAR POWERED APPARATUS

CROSS-REFERENCE TO RELATED APPLICATIONS

This application is a continuation of and claims priority under 35 U.S.C. §120 to co-pending U.S. application Ser. No. 11/829,192 titled "SOLAR POWERED APPARATUS" and filed on Jul. 27, 2007, which is herein incorporated by reference in its entirety.

BACKGROUND OF THE INVENTION

1. Field of Invention

At least one embodiment of the invention is directed to solar powered systems and methods for providing power and, more particularly, to solar lighting applications.

2. Discussion of Related Art

In 2006, global figures on rural energy access showed an estimated 2.4 billion people on Earth with no access to modern energy services, and approximately 1.6 billion people without access to electricity. The vast majority of these people are located in rural areas, many in poor countries, and it is unlikely that an electrical utility grid will extend to them in the near future.

For dispersed rural markets, improved energy services may come via distributed clean energy technologies, such as, solar photovoltaic modules and biogas. Many of the 1.6 billion people who are without access to electricity grids (i.e., who are in "off-grid" areas) live in warm, sunny locations. In these locations, solar photovoltaic systems are often the most cost effective way to provide electricity to off-grid areas.

Conventional solar photovoltaic systems use a battery to store energy collected from the sun during daylight hours. This battery is generally a 12 volt (V) battery that supplies direct current (DC) power. The systems may either be connected directly to 12 Vdc appliances, or may include a DC-AC converter to allow connection to more common AC (alternating current), higher voltage (e.g., 120 Vac or 230 Vac) appliances. This converter is generally an H-bridge inverter, as known to those skilled in the art.

SUMMARY OF INVENTION

Aspects and embodiments are directed to systems and methods that may provide a low-cost solution for solar powered lighting. The system may be particularly useful in rural locations where households and/or businesses do not have access to an electricity grid. According to one embodiment, a system may be connected directly to alternating current (AC) compact fluorescent lights to provide efficient, inexpensive lighting, as discussed in further detail below.

As discussed above, there are two types of conventional solar photovoltaic systems that may be used for lighting applications. However, each of these two types of systems suffers from significant drawbacks. The first type of system may be directly connected to 12 Vdc fluorescent lights. However, these 12 Vdc fluorescent lights are not mass produced on the scale of AC compact fluorescent lights and therefore, are not as cost effective. The other type of conventional system uses an inverter, a DC-AC converter, coupled between the battery and AC devices. However, these inverters add cost, complexity and losses to the system. At least some aspects and embodiments are directed to a solar photovoltaic system that can be used with low-cost, mass-produced AC compact fluorescent lights without adding the unnecessary cost, complexity and efficiency loss from an inverter.

According to one embodiment, an apparatus may comprise a battery, at least one photovoltaic cell (which may be part of solar module comprising multiple photovoltaic cells), and at least one DC-capable AC appliance (such as a compact fluorescent light). The apparatus may also comprise a first DC to DC converter that receives a first electrical signal from the at least one photovoltaic cell and provides a charging signal to the battery, and a second DC to DC converter that receives a second electrical signal from the battery and provides a DC power signal to the DC-capable AC appliance.

In one example, the first DC to DC converter may be a buck converter, or alternatively, a boost converter. In another example, the first DC to DC converter may include maximum power point tracking circuitry. In another example, the apparatus may further comprise a plurality of fixtures coupled to the second DC to DC converter, the plurality of fixtures each being coupled to a corresponding one of a plurality of compact fluorescent lights or other appliances. A microcontroller may be coupled to the first and second DC to DC converters and adapted to control components of the first and second DC to DC converters. In one example, a housing may be provided that houses the microcontroller, the first DC to DC converter and the second DC to DC converter, and optionally the battery as well.

According to another embodiment, a method providing power to a DC-capable AC appliance may comprise drawing power from a photovoltaic unit, and supplying a DC signal to the DC-capable AC appliance. In one example, the method may further comprise storing the power in a battery and drawing a DC signal from the battery.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

Various aspects of at least one embodiment are discussed below with reference to the accompanying figures. In the figures, which are not intended to be drawn to scale, each identical or nearly identical component that is illustrated in various figures is represented by a like numeral. For purposes of clarity, not every component may be labeled in every drawing. The figures are provided for the purposes of illustration and explanation and are not intended as a definition of the limits of the invention. In the figures.

DETAILED DESCRIPTION

Figure 1:
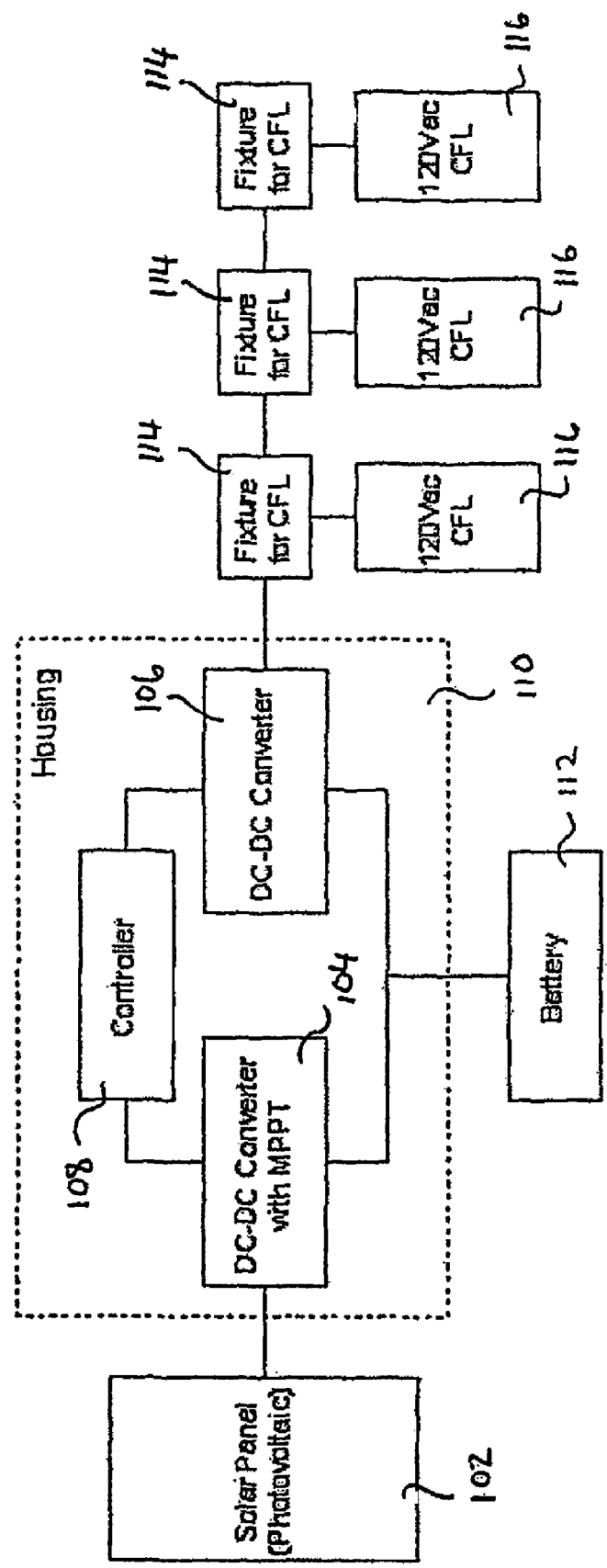
FIG. 1 is a block diagram of one example of a system according to aspects of the invention.

Many commercially available devices, such as, for example, compact fluorescent lights (CFLs), some televisions, radios etc., although typically constructed to receive alternating current (AC) power, rectify the incoming AC line to produce direct current (DC) power. Therefore, such devices may be powered directly by a DC signal, thus obviating the need for the inverter used in conventional systems. Such devices are referred to herein as DC-capable AC appliances. Accordingly, at least some aspects and embodiments are directed toward a solar photovoltaic system that provides direct connection access to DC-capable AC appliances, such as CFLs, without adding the unnecessary cost, complexity and efficiency loss from the inverter used in conventional systems. In addition, systems according to some embodiments may sustain or maximize the life of the battery by controlling the battery charge, as discussed below.

It is to be appreciated that this invention is not limited in its application to the details of construction and the arrangement of components set forth in the following description or illustrated in the drawings. The invention is capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in other embodiments. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Referring to FIG. 1, there is illustrated a block diagram of one example of a system according to aspects of the invention. The system 100 comprises a solar module 102, also referred to as a photovoltaic unit or solar panel. The solar module 102 comprises one or more, typically many, photovoltaic cells that convert energy received from sunlight into an electrical signal. In at least some applications, the solar module 102 may be a 100 Watt, or less, module. One example of a solar module that may be used is a 65 Watt module available from BP Solar under part number BP365U. The system may also comprise a first subsystem 104, a second subsystem 106 and a controller 108, which may be housed within a housing 110. The first and second subsystems 104, 106 are coupled to a battery 112. The battery may be external to the housing 110 as shown, or may be contained within the housing 110. In one example, the battery 112 may be a 12 V lead acid battery. The second subsystem 106 is also coupled to one or more fixtures 114, as discussed in more detail below. Each fixture 114 is coupled to a DC-capable AC appliance 116, such as a compact fluorescent light (CFL), small black and white or color television, radio or computer. It is to be appreciated that although the following discussion will focus on lighting applications and may refer primarily to the appliance as being a compact fluorescent light, the invention is not so limited and may be used with any DC-capable AC appliance. The system discussed herein may be used in a variety of applications, not limited to lighting, to provide electricity from a photovoltaic module.

During daylight hours, the system 100 draws power from the solar module 102 to store as much charge as possible in the battery 112 without overloading the battery and decreasing the battery life. To accomplish charging of the battery, in one embodiment, the first subsystem may comprise a DC to DC converter that draws power from the solar module 102 and uses the power to charge the battery 112. In one example, the first subsystem 104 may comprise a non-isolated buck converter. As known to those skilled in the art, a buck converter is a step-down DC to DC converter which may be implemented as a switched mode power supply including an inductor controlled by two switches, usually a transistor and a diode. In operation, the buck converter alternates between connecting the inductor to a source voltage (in this case, the solar module 102) to store power in the inductor and discharging the inductor into a load (in this case, the battery 112). A buck converter may be a very efficient (e.g., 95% efficient or higher) and simple converter design, and may be used particularly in those applications in which the voltage from the solar module is to be reduced before being supplied to the battery.

In another example, the first subsystem 104 may comprise a non-isolated boost converter. As known to those skilled in the art, a boost converter is a DC to DC converter with an output voltage greater than the source voltage. A non-isolated boost converter is one that does not include galvanic isolation provided, for example, by means of a transformer. The first subsystem 104 may therefore comprise a boost converter where it is desired to raise the voltage received from the solar module 102 before it is supplied to the battery 112.

Figure 2:
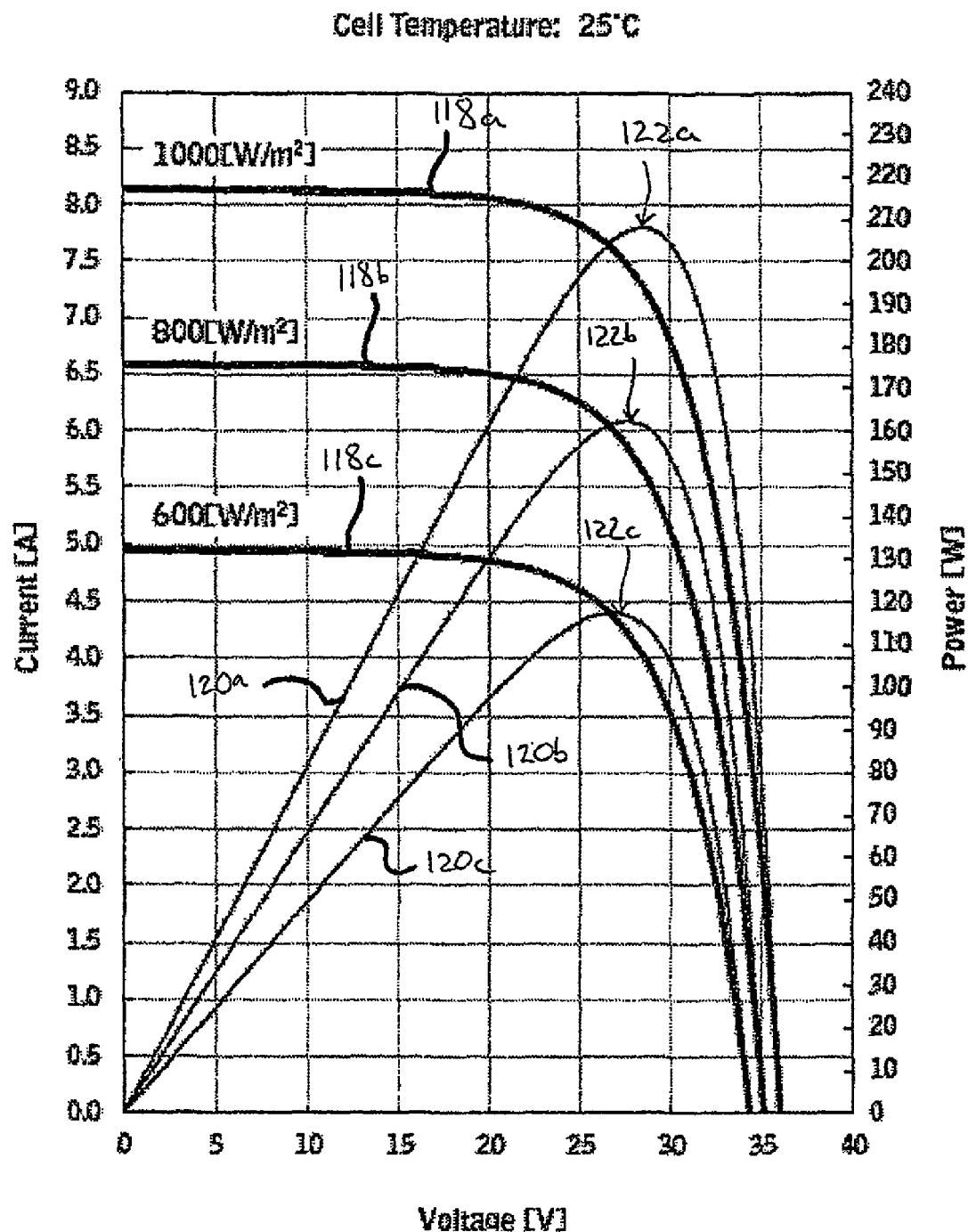
FIG. 2 is an illustration of example current vs. voltage and power vs. voltage curves for an exemplary solar module.

According to one embodiment, the first subsystem 104 may incorporate a maximum power point tracker (MPPT). As known to those skilled in the art, an MPPT is a high efficiency DC to DC converter which functions as an optimal electrical load for a solar module (in this case, the solar module 102) to extract maximum, or near maximum, power from the module. Photovoltaic modules, such as the solar module 102, have a single operating point under any conditions of sunlight and temperature where the values of the current (I) and voltage (V) of the cell result in a maximum power output. This is illustrated in FIG. 2 which shows three example current vs. voltage curves 118a, 118b and 118c for different sunlight conditions. These three current vs. voltage curves correspond to three power vs. voltage curves 120a, 120b and 120c, respectively. As can be seen in FIG. 2, each power vs. voltage curve has a single maximum point, 122a, 122b and 122c, respectively, where the power output of the photovoltaic cell is maximum. Maximum power point trackers use control circuitry or logic to search for this point and thus, to allow the DC to DC converter circuit to extract the maximum power available from a solar module 102.

Referring again to FIG. 1, the second subsystem 106 may include a step-up DC to DC converter that may be used to raise the voltage from the battery 112 to a voltage that can be used by the compact fluorescent lights 116. In addition, during some times of operation, the second subsystem 106 may receive power directly from the first subsystem 104, and may step-up the received voltage to the level required to power the appliance 116. For example, during times of full sunlight, the solar module 102 may generate more than sufficient energy to power the appliances 116, and the excess energy may be stored in the battery. During night, or low-sunlight conditions, however, little or no energy may be produced by the solar module 102 and some or all of the power needed for the appliances 116 may be drawn from the battery 112. Thus, the second subsystem may receive a signal from either, or both simultaneously, the first subsystem 104 and/or the battery 112, and may convert this signal to the level(s) appropriate for the appliances 116.

According to one embodiment, the second subsystem 106 may comprise an isolated or non-isolated step-up converter, depending on cost, efficiency and/or safety concerns. For example, if the step-up ratio is relatively small, for example, a ratio of 4 or 5 (e.g., from a 24 V battery to 120 Vdc), then non-isolated converters may generally be cheaper and more efficient. However, if the required step-up ratio is large (e.g., a ratio of about 10 or more), then an isolated converter using a transformer may be more cost effective and efficient. Isolated converters may also generally be considered safer than non-isolated converters because isolated converters do not have a conductive path between the input and output voltage points.

Figure 3:
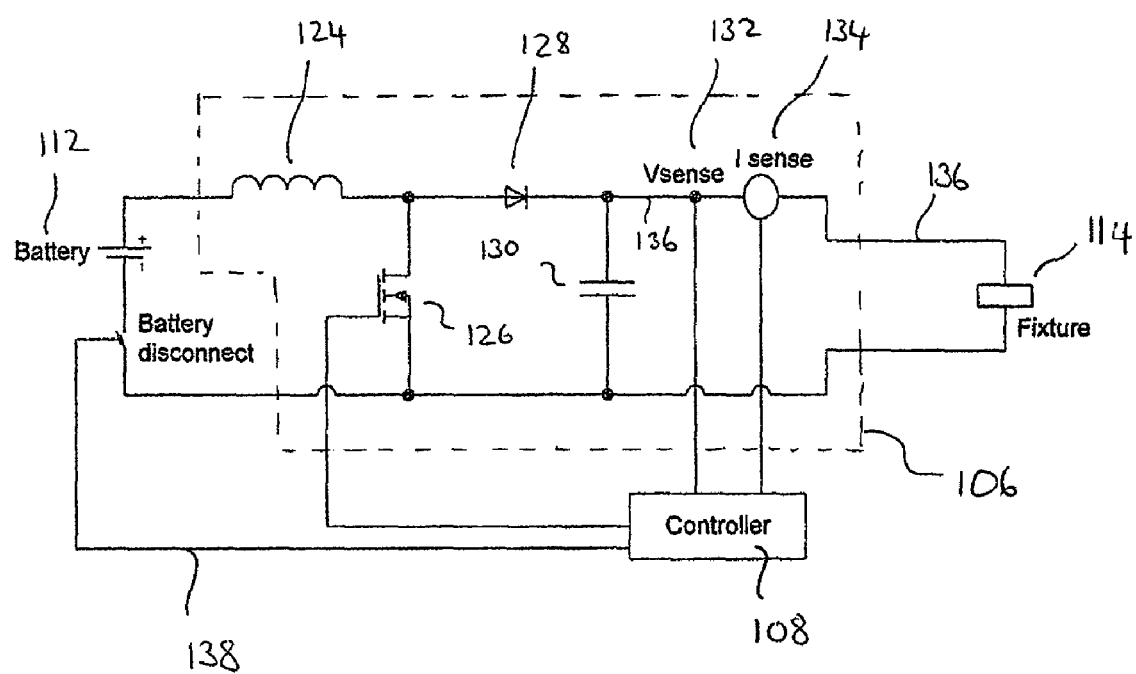
FIG. 3 is a more detailed block diagram of a portion of the system of FIG. 1 incorporating current and voltage monitoring according to aspects of the invention.

Referring to FIG. 3, there is illustrated one example of the second subsystem 106. The second subsystem may comprise an inductor 124, transistor 126, diode 128 and capacitor 130 to provide the DC to Dc up-conversion. In addition, according to one embodiment, the second subsystem 106, together with the controller 108, may implement monitoring of the current and/or voltage output from the second subsystem 106 to detect conditions that may indicate potential problems, such as short circuits, or connection of unsuitable appliances to the fixtures 114. As discussed above, numerous different types of appliances may be connected to the fixtures 114, provided these appliances are either DC appliances or DC-capable AC appliances, that is, appliances adapted to receive a DC power signal. Some appliances, such as compact fluorescent lights and some television sets, are designated "AC" devices, in that they can accept AC input power and may traditionally be connected to AC circuits, but are also capable of receiving a DC signal as discussed above (those devices being termed DC-capable AC appliances). However, other appliances may be "true" AC devices that cannot accept DC input power. These devices may typically include input transformers that may act as short circuits if they receive DC input power. It is possible that such true AC devices may be misconnected to the fixtures 114. The resulting current surge due to the short circuit condition caused by such devices may be hazardous, particularly because it may pose the risk of fire. In addition, conditions other than the connection of inappropriate devices may also cause current surges that could start fires or pose other safety risks. Such conditions may include, for example, damaged devices being connected to the fixtures 114 or damaged wiring between fixtures.

To prevent such power surges and thereby reduce the accompanying safety risks, embodiments of the system may include circuitry to monitor the current and/or voltage supplied from the second subsystem 106 to the fixtures 114. As shown in FIG. 3, in at least one embodiment, the controller 108 may be coupled to the output line 136 of the second subsystem 106 to sense the voltage (e.g., at connection point 132) and/or the current (e.g., at connection point 134) on line 136. If the controller 108 detects a voltage or current condition on line 136 that could indicate a short circuit or connection of a true AC load to the fixture 114, the controller may disconnect the battery, via a signal supplied on line 138, so as to remove any power from line 136. This provides a safety feature that may reduce the risk of fires or danger to personnel using the appliances connected to the fixtures 114.

According to another embodiment, the controller 108 may also be used to control the power components, such as field effect transistors (FETs) in both the first sub-system 104 and the second subsystem 106 (e.g., transistor 126 shown in FIG. 3). The controller 108 may comprise, for example, a low cost microprocessor or other control circuitry. The controller may control the first subsystem and monitor the battery charge so as to allow as much charge as possible to be stored in the battery 112 without overloading the battery and decreasing battery life. To achieve this function, the controller may be programmed with knowledge of a charge profile of the battery and may monitor the temperature of the battery to adjust voltage and current set points so as to charge the battery according to its charge profile. When the appliances 116 are in use, for example, after dusk if the appliances are compact fluorescent lights, the system draws power from the battery to power the appliances. In this case, the controller 108 may again monitor the battery and also control the second subsystem 106 so as to protect the battery by limiting the depth of discharge. To achieve this function, the controller 108 may monitor the battery current and voltage and may be programmed with a predetermined expected output of the battery in amp-hours. The controller may integrate the current supplied by the battery over time to measure the expended amp-hours, and may reduce battery power or disconnect the battery when the expended number of amp-hours nears the expected maximum number of amp-hours that the battery can deliver. In this manner, the controller 108 may protect the battery 112 against becoming completely discharged, thereby preventing damage to the battery.

In one embodiment, the fixtures 114 may incorporate switches that may adapt to the turning-off of a DC load. In one example, the fixtures may also incorporate protection circuitry to protect against arcing that may occur when a DC current is turned off. The fixtures may also be configured to allow easy "daisy-chaining" of additional fixtures.

Having thus described several aspects of at least one embodiment of this invention, it is to be appreciated various alterations, modifications, and improvements will readily occur to those skilled in the art. For example, although the second subsystem is described herein as including an up-converter, in some applications (for example, if low voltage devices, such as LED lights, were connected to the fixtures) the second subsystem may instead include a down-converter. Such and other alterations, modifications, and improvements are intended to be part of this disclosure and are intended to be within the scope of the invention. Accordingly, the foregoing description and drawings are by way of example only and the scope of the invention should be determined from proper construction of the appended claims, and their equivalents.

What is claimed is:

1. A solar powered apparatus configured to be connected to a DC-capable AC appliance, the apparatus comprising:
   a battery;
   at least one photovoltaic cell;
   a first DC to DC converter that receives a first electrical signal from the at least one photovoltaic cell and provides a charging signal to the battery; and
   a second DC to DC converter that receives a second electrical signal from at least one of the battery and the first DC to DC converter, and is configured to provide a DC power signal to the DC-capable AC appliance.

2. The solar powered apparatus as claimed in claim 1, wherein the first DC to DC converter is a non-isolated buck converter.

3. The solar powered apparatus as claimed in claim 1, wherein the first DC to DC converter is a boost converter.

4. The solar powered apparatus as claimed in claim 1, wherein the first DC to DC converter includes maximum power point tracking circuitry.

5. The solar powered apparatus as claimed in claim 1, further comprising a solar module comprising a plurality of photovoltaic cells, including the at least one photovoltaic cell.

6. The solar powered apparatus as claimed in claim 1, further comprising a plurality of fixtures coupled to the second DC to DC converter, each fixture of the plurality of fixtures configured to be coupled to a corresponding one of a plurality of DC-capable AC appliances.

7. The solar powered apparatus as claimed in claim 1, further comprising a microcontroller coupled to the first DC to DC converter and to the second DC to DC converter, the microcontroller being constructed and arranged to control components of the first and second DC to DC converters.

8. The solar powered apparatus as claimed in claim 7, further comprising a housing, and wherein the microcontroller, the first DC to DC converter and the second DC to DC converter are disposed within the housing.

9. The solar powered apparatus as claimed in claim 8, wherein the battery is disposed within the housing.

10. A photovoltaic system comprising:
a solar module including at least one photovoltaic cell, the solar module configured to convert energy received from sunlight into a first electrical signal;
a battery;
at least one fixture configured to be connected to a DC-capable AC appliance;
a first DC to DC converter coupled between the solar module and the battery, the first DC to DC converter configured to receive the first electrical signal from the solar module and to supply a charging signal to the battery; and
a step-up DC to DC converter coupled to the first DC to DC converter and to the battery and configured to receive a second electrical signal from at least one of the battery and the first DC to DC converter, the step-up DC to DC converter configured to provide a DC power signal to the at least one fixture, the DC power signal having a higher voltage than the second electrical signal.

11. The photovoltaic system as claimed in claim 10, wherein the first DC to DC converter is a non-isolated buck converter.

12. The photovoltaic system as claimed in claim 10, wherein the first DC to DC converter is a non-isolated boost converter.

13. The photovoltaic system as claimed in claim 10, wherein the step-up DC to DC converter is a non-isolated step-up DC to DC converter comprising an inductor, a transistor, a diode and a capacitor coupled together and configured to step-up a voltage of the second electrical signal to provide the DC power signal.

14. The photovoltaic system as claimed in claim 13, further comprising a controller coupled to the step-up DC to DC converter and configured to monitor at least one of the voltage and a current of the DC power signal to detect fault conditions.

15. The photovoltaic system as claimed in claim 14, wherein the controller is coupled to the battery and configured to disconnect the battery from the step-up DC to DC converter responsive to a detected fault condition.

16. The photovoltaic system as claimed in claim 10, wherein the at least one fixture includes a switch configured to turn off the DC power signal at the fixture.

17. The photovoltaic system as claimed in claim 10, wherein the at least one fixture comprises a plurality of fixtures, and further comprising a plurality of DC-capable AC appliances, each DC-capable AC appliance coupled to a corresponding one of the plurality of fixtures.

18. The photovoltaic system as claimed in claim 17, wherein the plurality of DC-capable AC appliances includes a plurality of compact fluorescent lights.

19. The photovoltaic system as claimed in claim 17, wherein the plurality of DC-capable AC appliances includes at least one of a television set, a radio, a computer, and a compact fluorescent light.

20. The photovoltaic system as claimed in claim 10, further comprising a controller coupled to the battery, the first DC to DC converter and the step-up DC to DC converter, the controller being programmed with a charge profile of the battery and configured to monitor a temperature of the battery and to control the first DC to DC converter to charge the battery according to the charge profile.

* * * * *